(12) United States Patent
Campbell et al.

(10) Patent No.: US 12,193,612 B2
(45) Date of Patent: Jan. 14, 2025

(54) APPARATUS, SYSTEM AND METHOD FOR FORMING A FILLED ROLL

(71) Applicants: Deborah A. Campbell, Whitewater, CO (US); Ian L. Campbell, Whitewater, CO (US)

(72) Inventors: Deborah A. Campbell, Whitewater, CO (US); Ian L. Campbell, Whitewater, CO (US)

( * ) Notice: Subject to any disclaimer, the term of this patent is extended or adjusted under 35 U.S.C. 154(b) by 375 days.

(21) Appl. No.: 17/191,468

(22) Filed: Mar. 3, 2021

(65) Prior Publication Data

US 2022/0279980 A1  Sep. 8, 2022

(51) Int. Cl.
*A23P 20/20* (2016.01)
*A47J 43/20* (2006.01)

(52) U.S. Cl.
CPC ............... *A47J 43/20* (2013.01); *A23P 20/20* (2016.08)

(58) Field of Classification Search
CPC ........... A47J 43/20; A23P 20/20; A21C 9/063
USPC ............................................. 99/450.1, 450.6
See application file for complete search history.

(56) References Cited

U.S. PATENT DOCUMENTS

| | | | | |
|---|---|---|---|---|
| 3,856,374 A | * | 12/1974 | Christen | A23B 4/052 |
| | | | | 312/263 |
| 4,649,599 A | * | 3/1987 | Beller | E05D 11/1007 |
| | | | | 16/319 |
| 5,381,728 A | * | 1/1995 | Tateno | A21C 5/02 |
| | | | | 99/485 |
| 5,511,807 A | * | 4/1996 | Snyder | B65F 1/16 |
| | | | | 220/908 |
| 5,634,396 A | * | 6/1997 | Isobe | A21C 9/063 |
| | | | | 99/450.6 |
| 2008/0089985 A1 | * | 4/2008 | Oneda | A23L 7/196 |
| | | | | 426/514 |
| 2015/0027323 A1 | * | 1/2015 | Campbell | A23P 20/20 |
| | | | | 99/450.6 |

FOREIGN PATENT DOCUMENTS

| | | | | |
|---|---|---|---|---|
| JP | 2014082950 A | * | 5/2014 | |
| WO | WO-2010055579 A1 | * | 5/2010 | A23L 7/10 |

* cited by examiner

*Primary Examiner* — Jeffrey T Carley
*Assistant Examiner* — Tiffany T Tran

(57) ABSTRACT

An apparatus and a method relate to forming a filled roll, a sushi roll with a nori seaweed wrap, for example. An issue arises in quickly and easily forming the filled roll at a place of convenience at home, for example. The present disclosure addresses the issue by providing the apparatus with two horizontal rods, front and back rods, the back rod positioned higher than the front rod. The rods are wrapped and connected by a continuous mat that grips without adhering to the rods and the filling. The back rod is positioned higher than the front rod. The continuous mat forms a longitudinal pocket between the two rods to receive filling. Rotating one of the two rods in one direction causes the filling to roll and forms a roll. The filled roll arises from the longitudinal pocket for removal while rotating the rods in another direction.

19 Claims, 8 Drawing Sheets

APPARATUS, SYSTEM AND METHOD FOR FORMING A FILLED ROLL

BACKGROUND

Manually rolling sushi is challenging for home cooks. Such consumers are interested in quickly and easily making sushi and other filled rolls at home, for example. A sushi machine that is simple in construction and easy to use and clean would benefit consumers.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by providing an apparatus for rolling sushi with a front rod and a back rod, which are wrapped by an endless (or continuous) mat made of a material that does not adhere to the filling (e.g., cooked rice and a seaweed sheet) or to the rods, but does grip when contacting the rods. The material is also food-grade. The back rod is positioned higher (e.g., back/upper) than the front rod (e.g., front/lower rod). The continuous mat forms a longitudinal pocket between the two rods for receive a filling. Rotating one of the two rods causes the filling to be formed into a roll. The longitudinal pocket further receives a wrapper that encircles and compresses the filling into a roll as the rods rotate. By rotating one rod in a reverse direction (e.g., the front/lower rod in a counterclockwise direction), the filled roll is removed from the apparatus.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
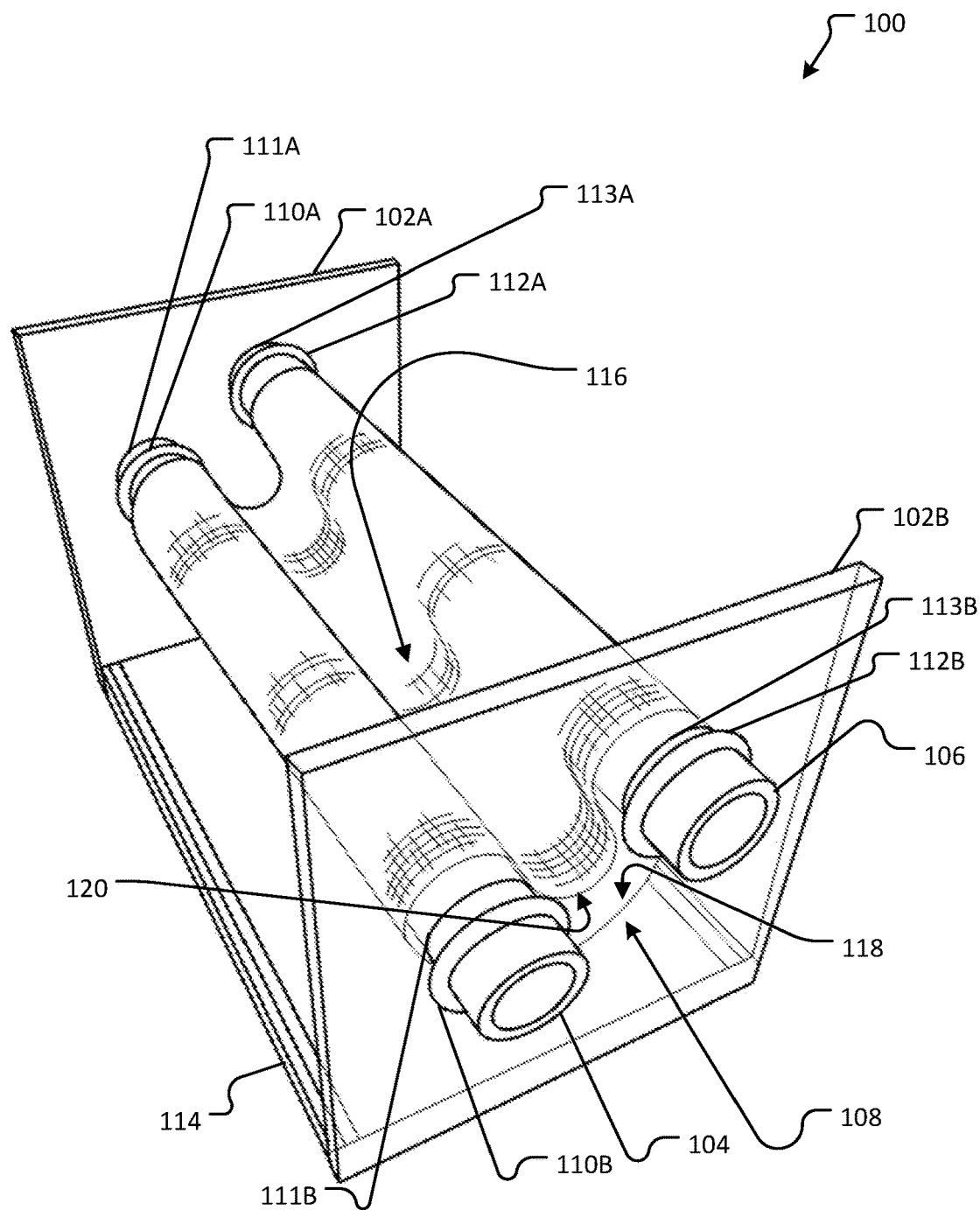
FIG. 1 illustrates an example apparatus in an operable state from a first perspective view point in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to an apparatus and methods for forming a filled roll. The filled roll may include a sushi roll, a California roll, for example. In aspects, a filled roll is suitable for human-consumption. The apparatus may include two rods and a continuous mat. The two rods include a front rod and a back rod. In aspects, the front rod is positioned lower than the back rod for ease of placing filler ingredients and removing a filled roll from the front of the apparatus. Each rod may be in the form of a cylinder, which may be solid or hollow, and may be defined by two parallel circular ends joined longitudinally by a curved surface. The front/lower rod and the back/upper rod may have the same diameter. In one example, the continuous mat may be formed by joining a first edge and an opposing second edge along a width of a rectangular sheet of matting, where a width of the continuous mat corresponds to the width of the rectangular sheet. In another example, the continuous mat may be formed by a variety of methods including but not limited to injection molding and 3-D printing. The width of an inner surface of the continuous mat may contact at least a portion of the longitudinal curved surface of each rod and may be operable to connect the two rods. Further, the continuous mat may form a longitudinal pocket between opposing proximal longitudinal surfaces of the two rods. Fillers, such as rice, strips of vegetables or fish, and the like, may be placed onto a wrapper within the longitudinal pocket of the continuous mat.

The rods may be rotated by manually actuating at least one circular end of one of the rods around its axis, e.g., the back/upper rod in a clockwise direction. In aspects, by rotating one rod, the continuous mat causes the other rod to rotate in the same direction around its axis. As the rods rotate about their axes, the fillers are compressed and encircled by the wrapper. In aspects, the wrapper may surround the fillers on at least a longitudinal curved surface of the roll, with circular ends of the roll being open to expose the fillers. To eject the filled roll, at least one rod is actuated in an opposite direction of the other rod, e.g., the back/upper rod clockwise and the front/lower rod counterclockwise. In this way, gears or other actuating members are unnecessary, promoting a simple design with few parts that reduces financial and efficiency costs associated with manufacture, assembly, maintenance and cleaning of the apparatus.

As detailed herein, the present disclosure describes an apparatus that addresses the issue of conveniently forming an edible roll with a simple mechanism that does not require use of gears or shifting of the two rods. The apparatus includes a front/lower rod, a back/upper rod, and a continuous mat, which is in contact with at least distal longitudinal surfaces of both rods to connect the two rods. The continuous mat may have a uniform width and thickness and may loosely wrap around the two rods, forming a longitudinal pocket between the two rods. To form the longitudinal pocket, the continuous mat may hang down between the two rods at a depth that is greater than a distance between the two rods. In aspects, the depth of the longitudinal pocket does not extend to touch an interior base of the apparatus.

FIG. 1 illustrates an overview of an example apparatus for forming a filled roll in accordance with aspects of the present disclosure. Apparatus 100 may represent an apparatus for forming a filling roll, e.g., a sushi roll.

The apparatus 100 includes a left wall 102A, a right wall 102B, and a base 114. The left wall 102A and the right wall 102B are vertical walls and are positioned in parallel. Each of the left wall 102A and the right wall 102B include two holes for installing rods. The apparatus further includes a front rod 104 (or a shaft) and a back rod 106 (or a shaft). In aspects, the front rod 104 extends through a lower hole having a diameter in the left wall 102A and in the right wall 102B. A diameter of the lower holes may be based on a diameter of the front rod 104, e.g., a diameter slightly larger than the diameter of the front rod 104 such that the front rod 104 is able to rotate but does not substantially move laterally or vertically within the hole. O-shaped rings (110A and 110B) may be attached to the front rod 104 on an exterior side of the left wall 102A and the right wall 102B to prevent the front rod 104 from sliding horizontally through the lower holes in the walls. Similarly, the back rod 106 extends through an upper hole of a diameter in the left wall 102A and in the right wall 102B. A diameter of the upper holes may be based on a diameter of the back rod 106, e.g., a diameter slightly larger than the diameter of the back rod 106 such that the back rod 106 is able to rotate but does not substantially move laterally or vertically within the hole. O-shaped rings (112A and 112B) may be attached to the back rod 106 on the exterior side of the left wall 102A and the right wall 102B to prevent the back rod 106 from sliding horizontally through the upper holes in the walls.

A continuous mat 108 wraps around the two rods. In aspects, the front rod 104 and the back rod 106 are freely rotatable. By manually actuating at least one circular end of one of the rods around its axis, e.g., the back/upper rod in a clockwise direction, the continuous mat causes rotational forces on the other rod to rotate in the same direction around its axis. While not shown in FIG. 1, one or both ends of the front rod 104 and/or the back rod 106 may be coupled to a handle or handles for actuating rotation of the at least one rod. In aspects, the left wall 102A, the right wall 102B, the base 114 may be made of a translucent material, such as acrylic and other polymer plastic.

As noted above, the continuous mat 108 forms a longitudinal pocket 116 between the two rods. The longitudinal pocket 116 may receive fillings and a wrapper (e.g., seaweed nori). The longitudinal pocket 116 is used for forming a filled roll as the front rod 104 and the back rod 106 rotate as the continuous mat 108 grips the exterior longitudinal surfaces of the rods. In aspects, a depth of the longitudinal pocket is at least a distance between the two rods. In some other aspects, the depth may depend on a diameter of one or both of the two rods. The depth may be within a predetermined distance, determined based at least on a diameter of one or both of the two rods, for example. In aspects, an inner surface of an upper portion 120 of the continuous mat 108 does not touch an inner surface of a lower portion 118 of the continuous mat 108 at the depth of the longitudinal pocket 116. Additionally, the depth of the longitudinal pocket may be determined such that the continuous mat 108 does not touch an inner surface of the base 114 of the apparatus. The continuous mat 108 may be made of food-grade silicone, for example.

In aspects, the continuous mat may provide surface characteristics where the continuous mat does not adhere to the filling (e.g., cooked rice or the sheet of seaweed) or the rods but does not slip when contacting the rods. In aspects, when a rotational force is applied to at least one rod, friction prevents the continuous mat 108 from slipping against the rods. In aspects, the gripping surface of the continuous mat reduces a chance of the continuous mat from slipping on the rods when the rods rotate beneath the continuous mat, based a force that is parallel to the endless sheet and in tangent to the surface of the rods, particularly when the filling is placed in the longitudinal pocket. The characteristics of the continuous mat (e.g., gripping the rods without adhering to the filling or the rods) helps forming the roll as the rods rotate. In aspects rotating one of the rods causes the other rod to rotate based on a friction of the wrapped endless (continuous) mat caused at least by a weight of the filling placed in the longitudinal pocket. Use of the continuous mat removes the need of using a set of gears to keep the driver rod and the driven rod engaged. Without use of the gears, the apparatus according to the present disclosure is easier to clean. The continuous mat may be in a form including but not limited to a mesh. The mesh silicone mat may grip the rods without adhering to the filling (rice, for example) or the rods.

In aspects, the O-rings 110A-B and 112A-B are removable for removing the rod from the apparatus by sliding the rods through the holes (111A, 111B, 113A, and 113B) on the left side panel and the right side panel. The continuous mat 108 is removable from the apparatus by removing the rods for cleaning.

In aspects the set of rods may be exchanged with another set of rods with a different thickness or diameter. Use of a pair of rods with a smaller diameter increases a distance between the pair of rods, thereby increasing a size of the longitudinal pocket 116 for creating a thicker roll. Use of a pair of rods with a larger diameter causes the longitudinal pocket 116 to be smaller, for creating a thinner roll. In the case of variable rod sizes, the holes 111A-B and 113A-B may be provided with a diameter for accommodating the largest-diameter rods. To install a set of rods with a smaller diameter, washers (not shown in figures) may be placed in the respective holes to decrease the hole size to fit the set of smaller-diameter rods.

In aspects, holes and slots on the apparatus 100 may be created using a laser cutter for accuracy and for ease of manufacturing. The left wall 102A, the right wall 102B, and the base 114 may be glued or otherwise adhered at respective joining edges. Alternatively, the three parts may be made of one piece that is bent at two locations, forming the left wall 102A, the right wall 102B, and the base 114 to reduce a number of parts in the apparatus.

As should be appreciated, the various methods, devices, applications, features, etc., described with respect to FIG. 1 are not intended to limit the apparatus 100 to being performed by the particular applications and features described.

Accordingly, additional controller configurations may be used to practice the methods and systems herein and/or features and applications described may be excluded without departing from the methods and systems disclosed herein.

Figure 2:
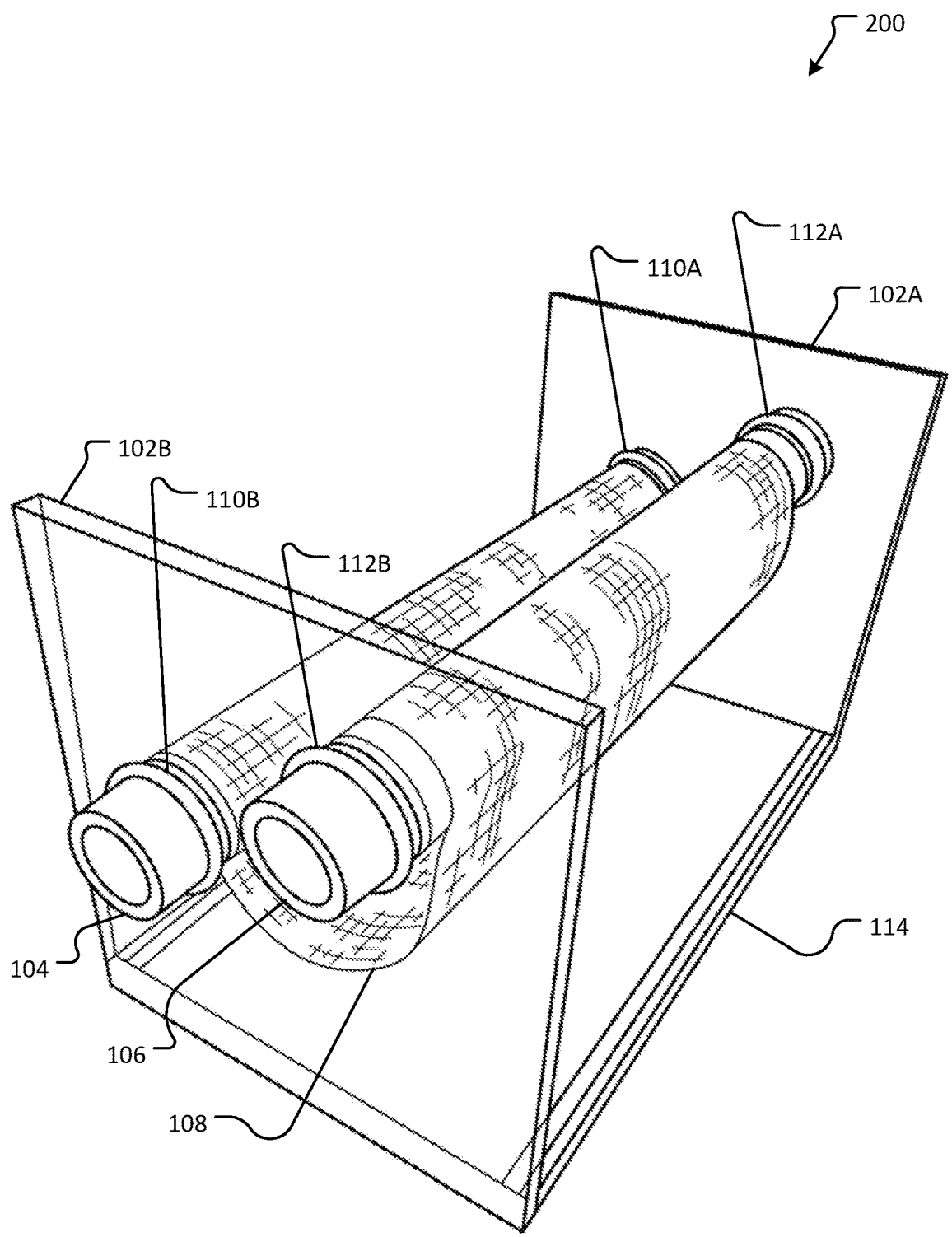
FIG. 2 illustrates an example apparatus in an operable state from a second perspective view point in accordance with aspects of the present disclosure.

FIG. 2 illustrates an example apparatus in an operable state from a second perspective view point in accordance with aspects of the present disclosure. Apparatus 200 may represent an apparatus for forming a filling roll, a sushi roll for example. The second view point is from an upper right position behind the apparatus.

Figure 3:
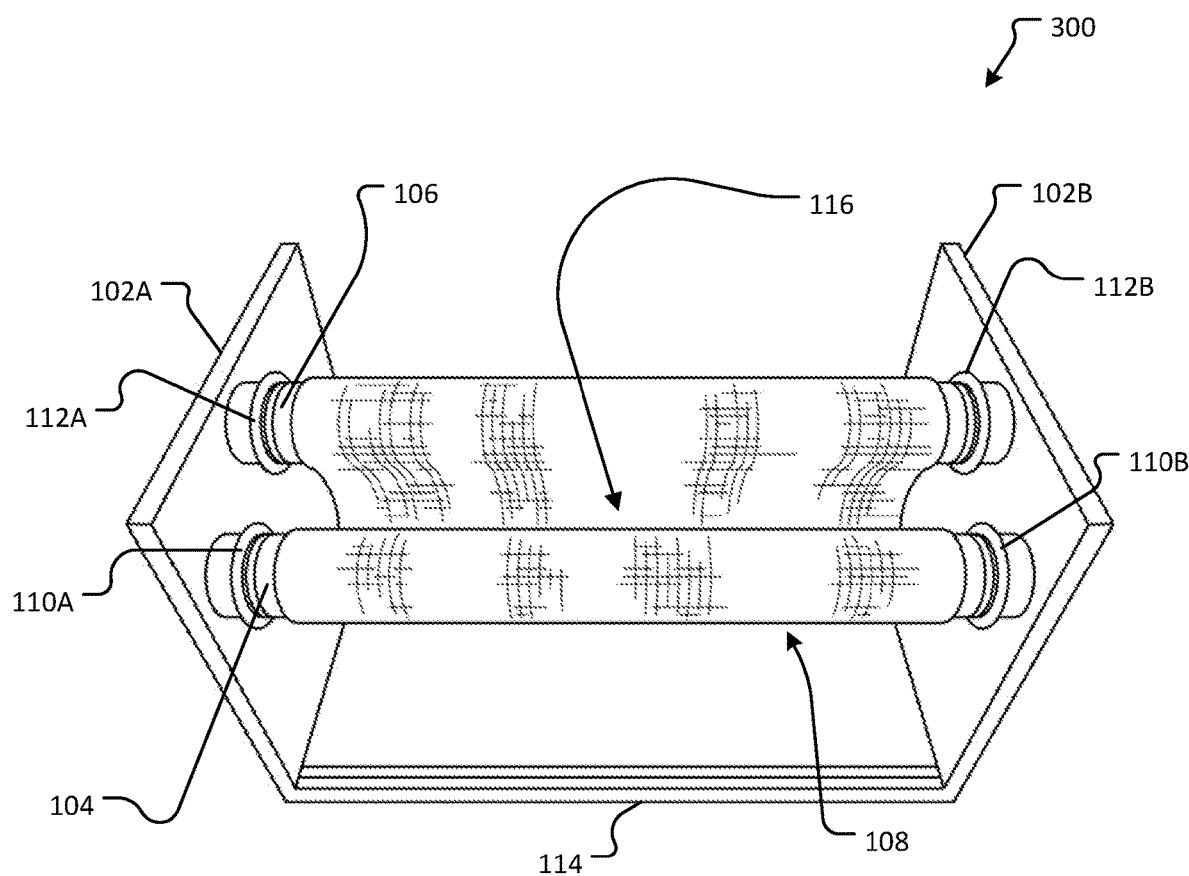
FIG. 3 illustrates an example apparatus in an operable state from an upper front view point in accordance with aspects of the present disclosure.

FIG. 3 illustrates an example apparatus in an operable state from an upper front view point in accordance with aspects of the present disclosure. Apparatus 300 may represent an apparatus for forming a filling roll, a sushi roll for example. The third view point is from a in front of and slightly above the apparatus.

Figure 4:
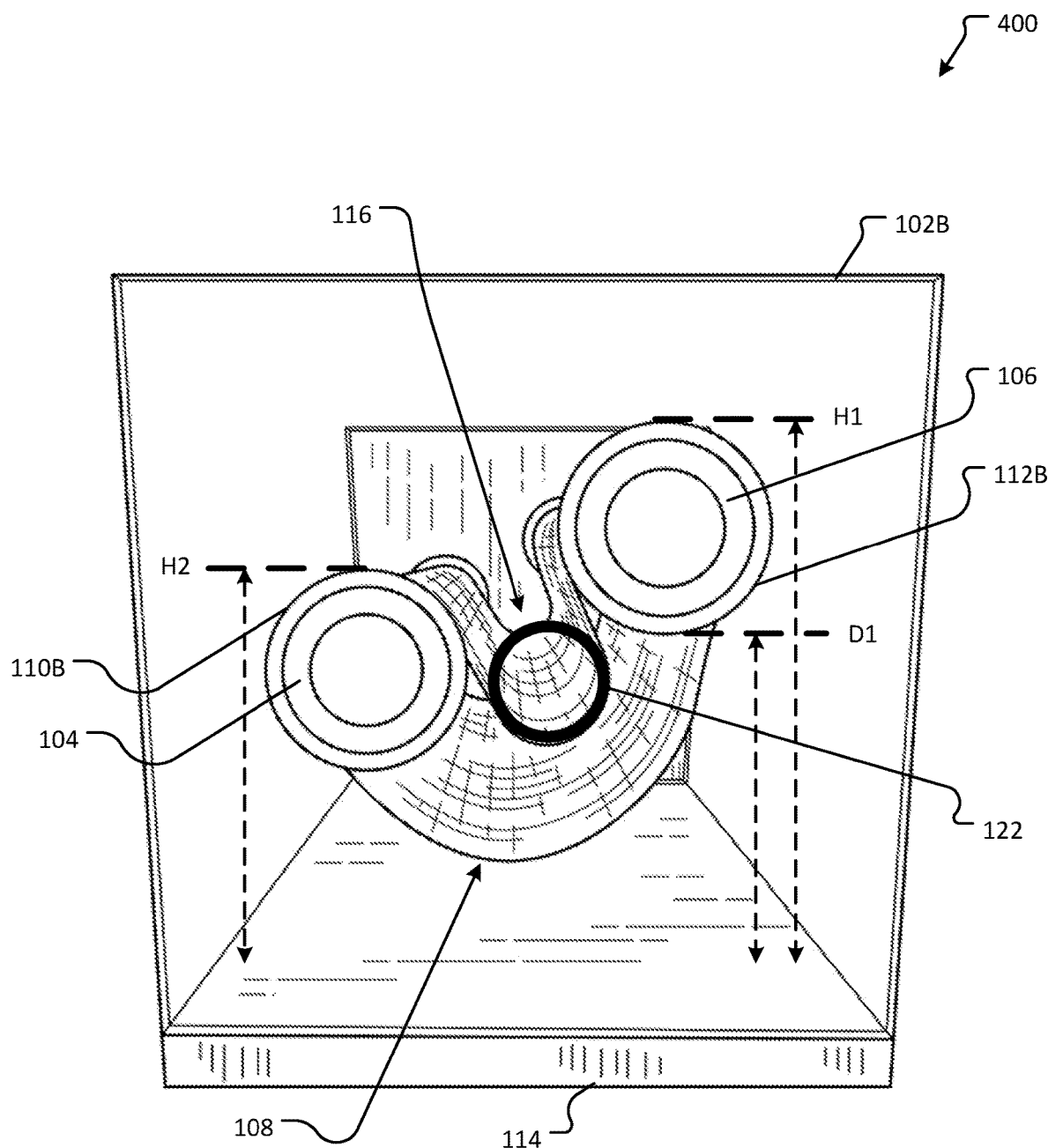
FIG. 4 illustrates an example apparatus in an operable state from a right-side view point in accordance with aspects of the present disclosure.

FIG. 4 illustrates an example apparatus in an operable state from a right-side view point in accordance with aspects of the present disclosure. Apparatus 400 may represent an apparatus for forming a filling roll, a sushi roll for example. The fourth view point is from the right side of the apparatus. The circle 122 referenced within the longitudinal pocket 116 indicates an exemplar position of a filled roll in the longitudinal pocket 116 of the apparatus 400.

In some aspects, the back rod 106 may be positioned higher than the front rod 104. That is, at least a height (H1) of the back rod 124 is greater than a height (H2) of the front rod 104. In some other aspects, a distance (D1) from the lowest longitudinal surface of the back rod 106 may be the same or less than the height (H2) of the front rod 104 (as shown, D1 is less than H2). The vertical positioning of the back rod 106 and the front rod 104 enables ease of receiving the filling from the front of the apparatus 400. The vertical positioning of the rods and the longitudinal pocket 116 formed there between prevents the filling from spilling out when rotating the rods to compress the filling within the wrapper. Once the filled roll is formed, the vertical positioning further enables the filled roll to be easily removed from the longitudinal pocket 116 by simply reversing a rotation (e.g., counterclockwise) of the lower/front rod 104 while maintaining a clockwise rotation of the upper/back rod 106.

Figure 5:
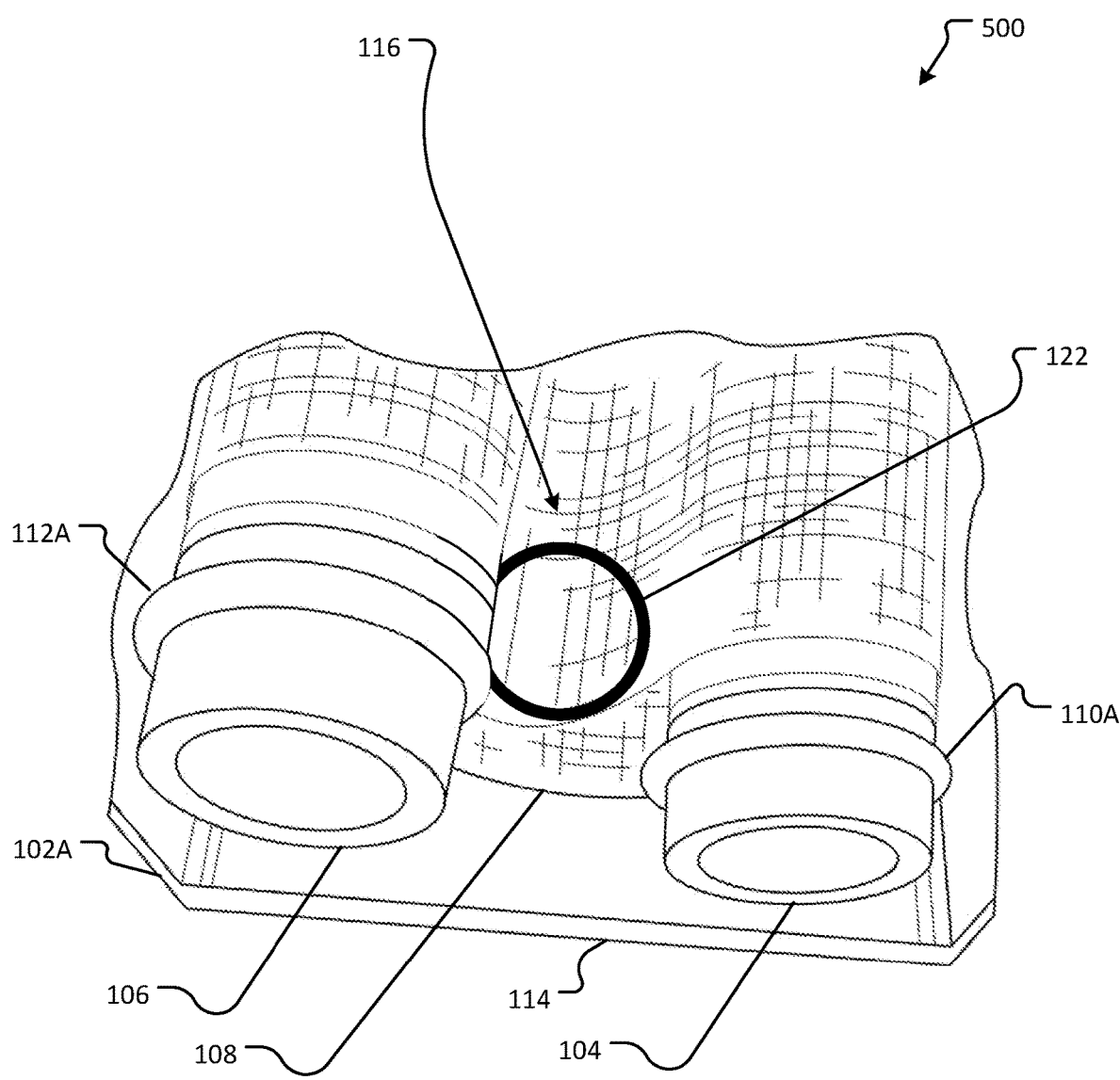
FIG. 5 illustrates an example apparatus in an operable state from an enlarged left-side view point in accordance with aspects of the present disclosure.

FIG. 5 illustrates an example apparatus in an operable state from an enlarged left-side view point in accordance with aspects of the present disclosure. The enlarged drawing indicates left ends of the front rod 104 and the back rod 106, for example. The circle 122 referenced within the longitudinal pocket 116 indicates an exemplar position of a filled roll in the longitudinal pocket 116 of the apparatus 500.

Figure 6:
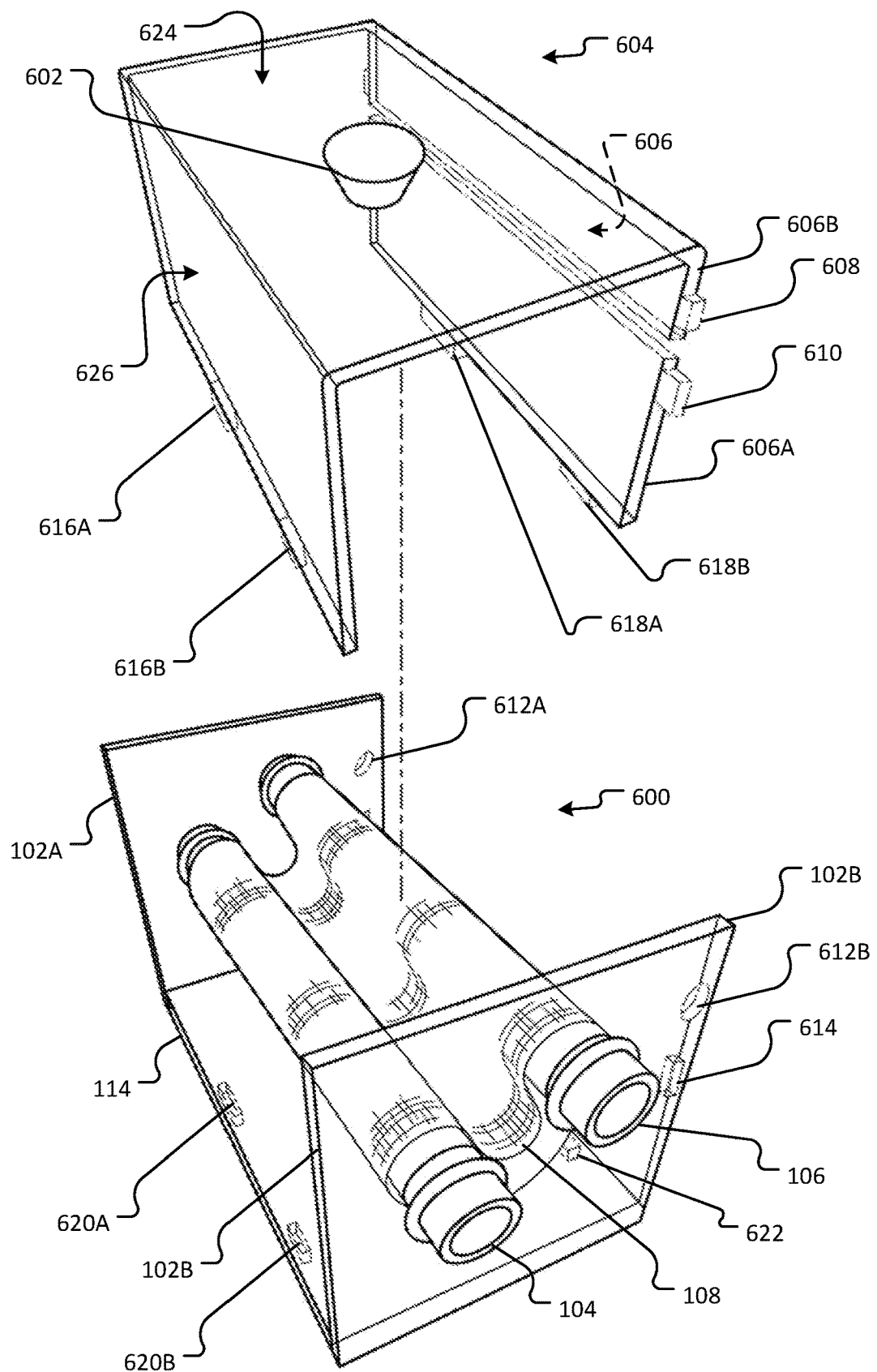
FIG. 6 illustrates an example apparatus and cover from the first perspective view point in accordance with aspects of the present disclosure.

FIG. 6 illustrates an example apparatus and cover from the first perspective view point in accordance with aspects of the present disclosure. FIG. 6 includes a cover 604 and an apparatus 600. In aspects, the cover 604 may comprise a top 624, a front wall 626 and a back wall 606. In aspects, the top 624 of cover 604 may include a knob 602 for raising and lowering cover 604 onto apparatus 600.

In some examples, the back wall 606 may comprise two portions, a fixed portion 606A and a hinged portion 606B. In this example, the hinged portion 606B may be affixed to the top 624 and removably adjoined to left wall 102A and right wall 102B of the apparatus 600. Further in this example, the fixed portion 606A may be removably adjoined to base 114, left wall 102A, and right wall 102B. In aspects, the cover 604 may comprise protruding members (or pegs) for removably adjoining the cover to the apparatus 600. Continuing with the example above, protruding member 608 on the right side of hinged portion 606B of cover 604 fits into a hole 612B of the right wall 102B of apparatus 600. While not shown, a protruding member on the left side of hinged portion 606B may fit into a hole 612A on the left wall 102A of apparatus 600. In aspects, the hole 612A and the hole 612B may be sized and shaped to enable rotation of the protruding members within the holes. The hole 612A and the hole 612B may be circular shaped, for example. This way, by rotating the protruding members clockwise within the holes, the cover 604 may swing open to enable access to front rod 104 and back rod 106 of apparatus 600 for use or cleaning.

Continuing with the above example, fixed portion 606A includes a protruding member 610 on a right edge that may fit into a hole 614 on right wall 102B. Additionally, fixed portion 606A may include another protruding member (not shown) along a left edge for fitting in a hole (not shown) in left wall 102A. In still further aspects, fixed portion 606A may include protruding member 618B for fitting into hole 622 of base 114. In aspects, the number of protruding members and corresponding holes described herein is not limited to two; there may be none, one, or more. In aspects, fixed portion 606A may act as a stopper for hinged portion 606B such that an angle of about 90 degrees is formed when hinged portion 606B rotates clockwise to rest against fixed portion 606A, thereby maintaining cover 604 in an open position.

In other examples, back wall 606 may comprise a single portion affixed to top 624 and removably adjoined to base 114. In aspects, the cover 604 and the fixed back wall 606 are in one piece to be placed over the apparatus 600. The front wall 626 and the back wall 606, respectively, include protruding members (or pegs) (616A-B and 618A-B) that fit into holes on the base 114. The protruding member 616A fits into a hole 620A; the protruding member 616B fits into a hole 620B; the protruding member 618A fits into a hole (not shown) on the base 114; and the protruding member 618B fits into a hole 622.

Figure 7:
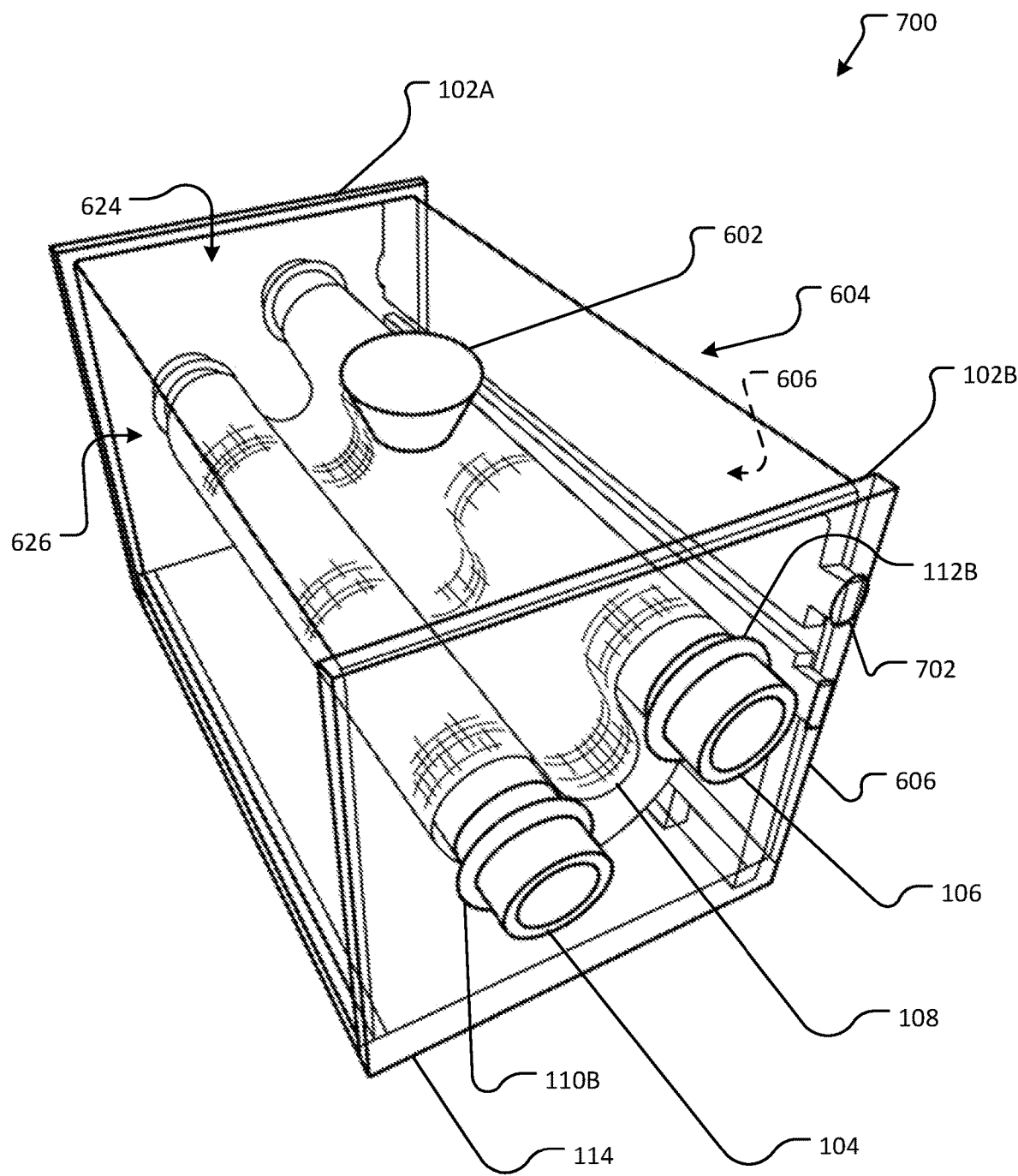
FIG. 7 illustrates an example covered apparatus in an inoperable state for storage from the first perspective view point in accordance with aspects of the present disclosure.

FIG. 7 illustrates an example covered apparatus in an inoperable state for storage from the first perspective view point in accordance with aspects of the present disclosure. In aspects, the front wall 626, top 624, and back wall 606 of cover 604 enclose the apparatus. The cover 604 may be made of a material such as acrylic or other polymer plastic. In some other aspects, either or both of the cover 604 and the base 114 may be made of materials such as bamboo or stainless steel. The cover 604 may be manufactured by bending a single sheet of the material at two locations using thermal or other methods, forming the front wall 626, top 624, and back wall 606 (or hinged portion 606B). The cover 604 may include an affixed knob 602 on the top 624 by a method including but not limited to a glue or acrylic screw into a hole created by a laser cut.

In aspects, manufacturing of the parts of the apparatus may include the following: 1) bend a single sheet of material (e.g., on a heat strip) to form the bottom base plate (base 114), left wall 102A and right wall 102B; 2) cut the base 114, left wall 102A and right wall 102B into individual pieces of material; 3) laser cut slots and holes in the base 114 and left and right walls 102A for insertion of rods and protruding members-B; 4) when formed of individual parts, glue the left and right walls 102A-B to the base 114; 5) cut rods to size; 6) adhere (e.g., using an adhesive such as glue) opposing ends of the mat to form the continuous mat; 7) cut material for cover 604 including tabs (the protruding members) and a hole to receive knob 602 using a laser cutter; for example. Thermal bending of the parts reduces a number of parts of the apparatus, simplifies the manufacturing process by eliminating the steps of using glues, and reduces manufacturing defects caused by errors in the gluing step.

In aspects, assembly of the apparatus 700 may include inserting the two rods 104, 106 through side holes (e.g., holes 111A-B and 113A-B) in the left and right walls 102A-B and through the continuous mat 108. Assembly of the cover over the apparatus may include steps of: 1) snapping the front wall 626 of the cover 604 into slots in a front edge of the base 114; and 2) snapping the back wall 606 of the cover 104 into a rear edge of the base 114; and 3) screwing the knob 602 into top 624 of the cover 604.

Figure 8:
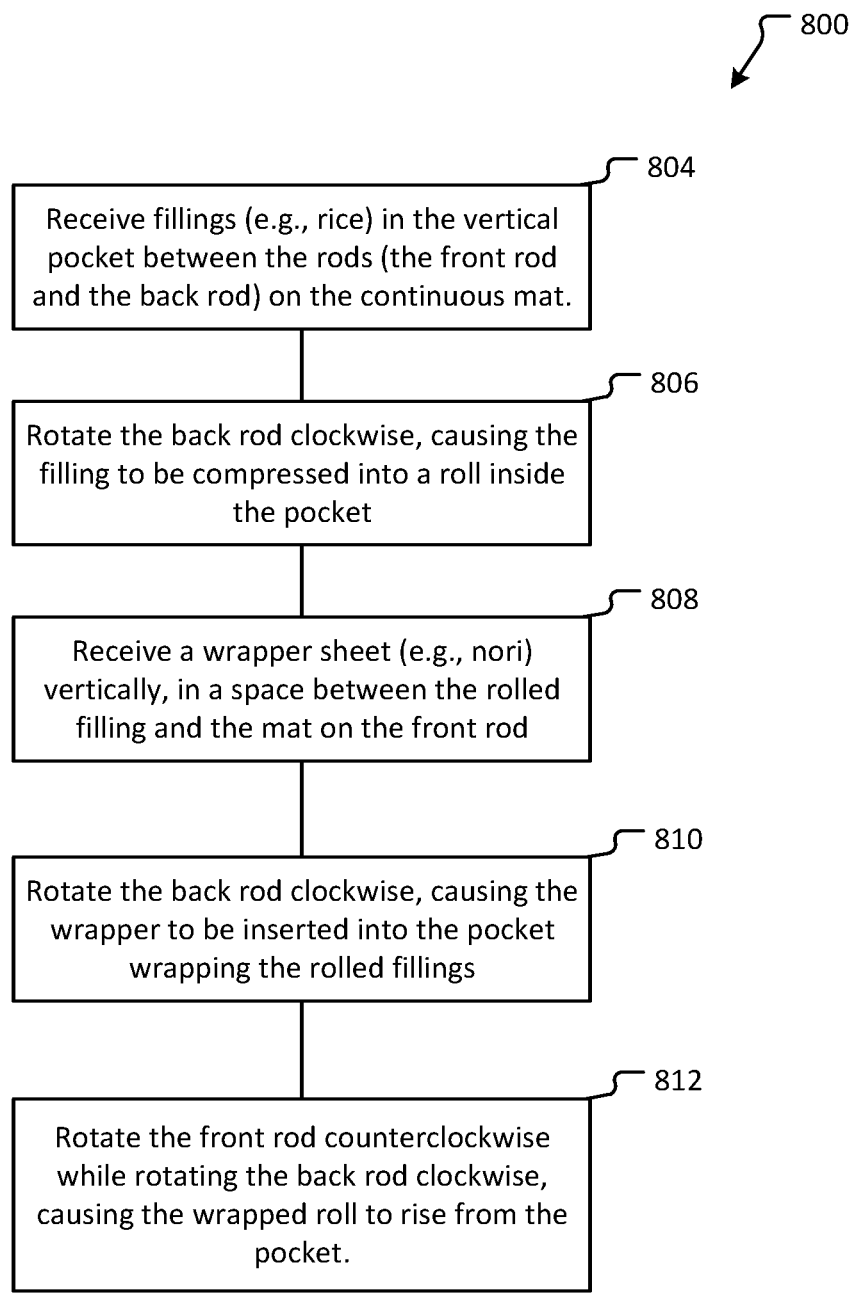
FIG. 8 illustrates an example method of forming a filled roll in accordance with aspects of the present disclosure.

FIG. 8 illustrates an example method of forming a filled roll in accordance with aspects of the present disclosure. A general order of the operations for method 800 is shown in FIG. 8. Generally, the method 800 starts with a receive operation 804 and ends with an rotate operation 812. The method 800 may include more or fewer steps or may arrange ordering of the steps differently than those shown in FIG. 8. The method 800 is directed to forming a filled roll. The method 800 can be executed by using an apparatus for forming a filled roll. Hereinafter, the method 800 shall be explained with reference to the systems, component, devices, modules, methods, etc., described in conjunction with FIGS. 1-7.

At receive operation 804, a filling is received into a longitudinal pocket formed by a continuous mat between a front rod and a back rod of an apparatus. The filling may include rice, vegetables, and slices of fish or egg, for example. In aspects, a weight of the filling in the longitudinal pocket increases a tension of the continuous mat, increasing a grip of the continuous mat on the front rod and the back rod. The increased tension of the continuous mat may improve the gripping characteristics of the continuous mat.

At rotate operation 806, the back rod may be rotated clockwise or counterclockwise (e.g., from a right-side viewpoint of the apparatus). Based on the continuous mat gripping both the back rod and the front rod, the front rod rotates in the same direction (e.g., clockwise or counterclockwise) as the back rod. In aspects, the rotation may be caused when an operator manually rotates the back rod by contacting one or both ends of the back rod. The rotate operation 806 causes the filling to be compressed inside the longitudinal pocket. In aspects, continuing rotate operation 806 causes a roll of filling to be formed within the longitudinal pocket of the continuous mat. The continuous mat may be configured to grip the rods while not adhering to the filling. During the rotate operation 806, the filling may also rotate within the longitudinal pocket to form a roll. In some aspects, both the front rod and the back rod may be rotated in the same direction (clockwise or counterclockwise), causing the filling to rotate within the longitudinal pocket. The characteristics of the continuous mat may enable gripping the rods without adhering to the filling, sticky-rice, for example. In this way, the filling is prevented from overflowing from and/or adhering to the longitudinal pocket. The user may stop the rotate operation 806 operation when the filling has formed a roll inside the longitudinal pocket.

At receive operation 808, the apparatus may receive a wrapper sheet (e.g., a nori seaweed sheet). In aspects, the receive operation 808 receives the wrapper vertically, in a space between the rolled filling (or the formed roll without the wrapper) and a portion of the continuous mat gripping the front rod.

At rotate operation 810, the back rod may be rotated clockwise or counterclockwise (e.g., from a right-side viewpoint of the apparatus). The rotate operation 810 causes the wrapper to be inserted into the longitudinal pocket along the continuous mat between the rolled filling and the continuous mat. Continuing the rotate operation 810 may cause the wrapper to completely wrap around the filling to form a filled roll.

At counter rotate operation 812, the front rod may be rotated in an opposite direction from the back rod. That is, as the back rod is rotated clockwise (or counterclockwise), the front rod is rotated counterclockwise (or clockwise, respectively). That is, the direction of the counter rotate operation 812 is a reverse rotation of the rotate operations 806 and 810. In aspects, the operator may grip one or both ends of the front rod for the counter rotate operation 812 while gripping one or both of the back rod for rotate operation 810. The counter rotate operation 812 may cause the wrapped roll to rise from the longitudinal pocket for easy removal of the wrapped roll from the apparatus.

As should be appreciated, operations 804-812 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

The operating environment may be a manual operation while the apparatus is placed on a table or a desk. In some other aspects, the operation environment may be an automated operation where at least one of the rods attaches to a motor, for example. The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to an apparatus for forming a filled roll of food. The apparatus comprises: a first wall; a second wall; a base, wherein the first wall and the second wall adjoin the base along opposing side edges of the base; a first rod and a second rod, wherein a first end of each rod extends horizontally through the first wall and a second end of each rod extends horizontally through the second wall, wherein the first rod and the second rod are about parallel to the base, wherein the first rod is positioned forward of the second rod by a predetermined distance, and wherein the first rod is positioned lower vertically than the second rod; a continuous mat wrapping around the first rod and the second rod, wherein the continuous mat grips without adhering to an external longitudinal surface of the first rod and the second rod, and wherein when the first rod is rotated in a first direction the continuous mat causes the second rod to rotate in the first direction; and a longitudinal pocket formed by the continuous mat between the first rod and the second rod, wherein rotating the first rod in the first direction causes a filling within the longitudinal pocket to form a roll, and wherein rotating the second rod in a second direction opposite the first direction causes the roll to be ejected from the longitudinal pocket.

In the apparatus, the first wall and the second wall adjoin the base based on at least one of: gluing, interlocking members, hinges, bending, molding, and printing. The first wall and the second wall adjoin the base respectively forming an angle of about 90 degrees. The first wall and the second wall are oriented vertically, and wherein the base is oriented horizontally. The apparatus further comprises a removable cover for storage, removably adjoining the left wall and the right wall along top edges respectively, and removably adjoining the base along a front edge and a rear edge of the base. The apparatus further comprises a removable back panel, the removable back panel including a first protruding member and second protruding member, the first protruding member configured to extend into a first hole on the left wall, the second protruding member configured to extend into a second hole on the right wall, and the removable back panel removably adjoining the base along a back edge of the base. The apparatus further comprises a removable cover for storage, removably adjoining the left wall and the right wall along top edges respectively, removably adjoining the base along a front edge, and removably adjoining the removable back panel along a top edge of the removable back panel. The removable cover includes a front wall, a top, and a back wall including vertical edges, the top including a handle, the back wall including a first protruding member and a second protruding member along the vertical edges, the first protruding member extending through a first hole on the left wall, the second protruding member extending through a second hole on the right wall, and the cover being rotatable at the protruding members for opening and closing the cover on the apparatus. The first direction of rotation relates to a clockwise rotation of the first rod from a view point on the right side of the apparatus, and the second direction of rotation relates to a counterclockwise rotation of the first rod from the view point.

In another aspect, the technology relates to a system for forming a filled roll food. The system comprises: a first wall; a second wall; a base, wherein the first wall and the second wall adjoin the base along opposing side edges of the base; a first rod and a second rod, wherein a first end of each rod extends horizontally through the first wall and a second end of each rod extends horizontally through the second wall, wherein the first rod and the second rod are about parallel to the base, wherein the first rod is positioned forward of the second rod by a predetermined distance, and wherein the first rod is positioned lower vertically than the second rod; a continuous mat wrapping around the first rod and the second rod, wherein the continuous mat grips without adhering to an external longitudinal surface of the first rod and the second rod, and wherein when the first rod is rotated in a first direction the continuous mat causes the second rod to rotate in the first direction; and a longitudinal pocket formed by the continuous mat between the first rod and the second rod, wherein rotating the first rod in the first direction causes a filling within the longitudinal pocket to form a roll, and wherein rotating the second rod in a second direction opposite the first direction causes the roll to be ejected from the longitudinal pocket.

In the system, the first wall and the second wall adjoin the base based on at least one of: gluing, interlocking members, hinges, bending, molding, and printing. The first wall and the second wall adjoin the base respectively forming an angle of about 90 degrees. The first wall and the second wall are oriented vertically, and wherein the base is oriented horizontally. The system further comprises a removable cover for storage, removably adjoining the left wall and the right wall along top edges respectively, and removably adjoining the base along a front edge and a rear edge of the base. The system further comprises a removable back panel, the removable back panel including a first protruding member and second protruding member, the first protruding member configured to extend into a first hole on the left wall, the second protruding member configured to extend into a second hole on the right wall, and the removable back panel removably adjoining the base along a back edge of the base; and a removable cover for storage, removably adjoining the left wall and the right wall along top edges respectively, removably adjoining the base along a front edge, and removably adjoining the removable back panel along a top edge of the removable back panel. The removable cover includes a front wall, a top, and a back wall including vertical edges, the top including a handle, the back wall including a first protruding member and a second protruding member along the vertical edges, the first protruding member extending through a first hole on the left wall, the second protruding member extending through a second hole on the right wall, and the cover being rotatable at the protruding members for opening and closing the cover on the apparatus.

In another aspect, the technology relates to a method of forming a filled roll food. The method comprises receiving a filling into a longitudinal pocket formed by a continuous mat wrapped around a first rod and a second rod, wherein a first end of each of the first rod and the second rod extends horizontally through the first wall and a second end of the first rod and the second rod extends horizontally through the second wall, wherein the first rod and the second rod are about parallel to the base, wherein the first rod is positioned forward of the second rod by a predetermined distance, and wherein when the first rod is positioned lower vertically than the second rod, wherein the continuous mat grips without adhering to an external longitudinal surface of the first rod and the second rod; rotating the first rod in a first direction causing the filling within the longitudinal pocket to form a roll; and rotating the second rod in a second direction opposite the first direction causes the roll to be ejected from the longitudinal pocket. T the first wall and the second wall adjoin the base based on at least one of: gluing, interlocking members, hinges, bending, molding, and printing. The first wall and the second wall adjoin the base respectively forming an angle of about 90 degrees. The first wall and the second wall are oriented vertically, and wherein the base is oriented horizontally.

Any of the one or more above aspects in combination with any other of the one or more aspect. Any of the one or more aspects as described herein.

What is claimed is:

1. An apparatus for forming a filled roll food, said apparatus comprising:
   a first wall;
   a second wall;
   a base, wherein the first wall and the second wall adjoin the base along opposing side edges of the base;
   a first rod and a second rod, wherein a first end of each rod extends horizontally through the first wall and a second end of each rod extends horizontally through the second wall, wherein the first rod and the second rod are parallel to the base, wherein the first rod is positioned behind the second rod by a predetermined distance, and wherein the first rod is positioned higher vertically than the second rod;

a continuous mat wrapping around the first rod and the second rod, wherein the continuous mat grips without adhering to an external longitudinal surface of the first rod and the second rod, and wherein when the first rod is rotated in a first direction the continuous mat causes the second rod to rotate in the first direction; and a longitudinal pocket formed by the continuous mat between the first rod and the second rod, wherein rotating the first rod in the first direction causes a filling within the longitudinal pocket to form a roll, wherein rotating the second rod in a second direction opposite the first direction while rotating the first rod in the first direction causes the roll to be ejected from the longitudinal pocket according to a friction between the continuous mat and the first and second rods, and the friction is further caused by a weight of the filling within the longitudinal pocket.

2. The apparatus of claim 1, wherein the first wall and the second wall adjoin the base based on at least one of:
   gluing,
   interlocking members,
   hinges,
   bending,
   molding, and
   printing.

3. The apparatus of claim 1, wherein the first wall and the second wall adjoin the base respectively forming an angle of 90 degrees.

4. The apparatus of claim 1, wherein the first wall and the second wall are oriented vertically, and wherein the base is oriented horizontally.

5. The apparatus of claim 1, the apparatus further comprising:
   a removable cover for storage, removably adjoining the left wall and the right wall along top edges respectively, and removably adjoining the base along a front edge and a rear edge of the base.

6. The apparatus of claim 1, the apparatus further comprising:
   a removable back panel, the removable back panel including a first protruding member and a second protruding member, the first protruding member configured to extend into a first hole on the left wall, the second protruding member configured to extend into a second hole on the right wall, and the removable back panel removably adjoining the base along a back edge of the base.

7. The apparatus of claim 6, the apparatus further comprising:
   a removable cover for storage, removably adjoining the left wall and the right wall along top edges respectively, removably adjoining the base along a front edge, and removably adjoining the removable back panel along a top edge of the removable back panel.

8. The apparatus of claim 7, wherein the removable cover includes a front wall, a top, and a back wall including vertical edges, the top including a handle, the back wall including a first protruding member and a second protruding member along the vertical edges, the first protruding member of the back wall extending through a first hole on the left wall, the second protruding member of the back wall extending through a second hole on the right wall, and the removable cover being rotatable at the first protruding member and the second protruding member of the back wall for opening and closing the removable cover on the apparatus.

9. The apparatus of claim 1, wherein the first direction of rotation represents a clockwise rotation of the first rod from a view point on the right side of the apparatus, and the second direction of rotation represents a counterclockwise rotation of the second rod from the view point.

10. A system for forming a filled roll food, the system comprising:
    a first wall;
    a second wall;
    a base, wherein the first wall and the second wall adjoin the base along opposing side edges of the base; a first rod and a second rod, wherein a first end of each rod extends horizontally through the first wall and a second end of each rod extends horizontally through the second wall, wherein the first rod and the second rod are parallel to the base, wherein the first rod is positioned behind the second rod by a predetermined distance, and wherein the first rod is positioned higher vertically than the second rod;
    a continuous mat wrapping around the first rod and the second rod, wherein the continuous mat grips without adhering to an external longitudinal surface of the first rod and the second rod, and wherein when the first rod is rotated in a first direction the continuous mat causes the second rod to rotate in the first direction; and
    a longitudinal pocket formed by the continuous mat between the first rod and the second rod, wherein rotating the first rod in the first direction causes a filling within the longitudinal pocket to form a roll, and wherein rotating the second rod in a second direction opposite the first direction while rotating the first rod in the first direction causes the roll to be ejected from the longitudinal pocket according to a friction between the continuous mat and the first and second rods, and the friction is further caused by a weight of the filling within the longitudinal pocket.

11. The system of claim 10, wherein the first wall and the second wall adjoin the base based on at least one of:
    gluing,
    interlocking members,
    hinges,
    bending,
    molding, and
    printing.

12. The system of claim 10, wherein the first wall and the second wall adjoin the base respectively forming an angle of 90 degrees.

13. The system of claim 10, wherein the first wall and the second wall are oriented vertically, and wherein the base is oriented horizontally.

14. The system of claim 10, the system further comprising:
    a removable cover for storage, removably adjoining the left wall and the right wall along top edges respectively, and removably adjoining the base along a front edge and a rear edge of the base.

15. The system of claim 10, the system further comprising:
    a removable back panel, the removable back panel including a first protruding member and a second protruding member, the first protruding member configured to extend into a first hole on the left wall, the second protruding member configured to extend into a second hole on the right wall, and the removable back panel removably adjoining the base along a back edge of the base; and a removable cover for storage, removably adjoining the left wall and the right wall along top edges respectively, removably adjoining the base along a front edge, and removably adjoining the removable back panel along a top edge of the removable back panel.

16. A method of forming a filled roll food, the method comprising: receiving a filling into a longitudinal pocket formed by a continuous mat wrapped around a first rod and a second rod, wherein a first end of each of the first rod and the second rod extends horizontally through a first wall and a second end of the first rod and the second rod extends horizontally through a second wall, wherein the first rod and the second rod are parallel to a base, wherein the first rod is positioned behind the second rod by a predetermined distance, and wherein when the first rod is positioned higher vertically than the second rod, wherein the continuous mat grips without adhering to an external longitudinal surface of the first rod and the second rod; rotating the first rod in a first direction causing the filling within the longitudinal pocket to form a roll; and rotating the second rod in a second direction opposite the first direction while rotating the first rod in the first direction causes the roll to be ejected from the longitudinal pocket according to a friction between the continuous mat and the first and second rods, and the friction is further caused by a weight of the filling within the longitudinal pocket.

17. The method of claim 16, wherein the first wall and the second wall adjoin the base based on at least one of:
    gluing,
    interlocking members,
    hinges,
    bending,
    molding, and
    printing.

18. The method of claim 16, wherein the first wall and the second wall adjoin the base respectively forming an angle of 90 degrees.

19. The method of claim 16, wherein the first wall and the second wall are oriented vertically, and wherein the base is oriented horizontally.

* * * * *